(12) United States Patent
Kreppel

(10) Patent No.: US 6,415,151 B1
(45) Date of Patent: Jul. 2, 2002

(54) METHOD AND MOBILE RADIO TELEPHONE NETWORK FOR HANDLING A PACKET DATA SERVICE

(75) Inventor: Jan Kreppel, Penzberg (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/347,211

(22) Filed: Jul. 2, 1999

(30) Foreign Application Priority Data

Jul. 6, 1998 (DE) ......................... 198 30 164
Oct. 27, 1998 (DE) ......................... 198 49 578

(51) Int. Cl.$^7$ ................................. H04Q 7/20
(52) U.S. Cl. .................. 455/445; 455/417; 370/338; 370/401
(58) Field of Search ................ 455/445, 417, 455/439, 446, 452, 450; 370/401, 338, 352, 353, 469, 409, 422; 379/207, 220, 221, 227, 229, 271, 273, 269

(56) References Cited

U.S. PATENT DOCUMENTS

| | | | | |
|---|---|---|---|---|
| 5,943,327 A | * | 8/1999 | Mademann | 370/329 |
| 5,970,059 A | * | 10/1999 | Ahopelto et al. | 370/338 |
| 5,978,386 A | * | 11/1999 | Hamalainen et al. | 370/466 |
| 5,996,021 A | * | 11/1999 | Vivanlar et al. | 709/238 |
| 6,101,539 A | * | 8/2000 | Kennelly et al. | 709/223 |
| 6,160,804 A | * | 12/2000 | Ahmed et al. | 370/349 |
| 6,233,458 B1 | * | 5/2001 | Haumont et al. | 455/445 |
| 6,256,300 B1 | * | 7/2001 | Ahmed et al. | 370/331 |
| 6,301,479 B1 | * | 10/2001 | Roobol et al. | 455/436 |
| 6,321,259 B1 | * | 11/2001 | Ouellett et al. | 709/220 |

FOREIGN PATENT DOCUMENTS

WO  WO 98/32304  * 7/1998 ............ H04Q/7/38

OTHER PUBLICATIONS

GSM 03.78 version 5.5.0 Release 1996, TS 101 044, Digital cellular telecommunications system (Phase 2+); Customized Applications for Mobile network Enhanced Logic (CAMEL)—Stage 2, pp. 1–80.

GSM 03.60 version 6.1.1 Release 1997, Draft EN 301 344, Digital cellular telecommunications system (Phase 2+); General Packet Radio Service (GPRS); Service description; Stage 2, pp. 1–102.

* cited by examiner

Primary Examiner—Nay Maung
Assistant Examiner—Sonny Trinh
(74) Attorney, Agent, or Firm—Morrison & Foerster LLP

(57) ABSTRACT

Proceeding from the handling of a packet data service in the mobile radio telephone network by at least one service network node (SGSNa, SGSNn) in conjunction with an access network node (GGSN) for the transmission of packet data, the following occurs. An interworking of the packet data service with network functions of an intelligent network whereof a service switching function (SSF) is interconnected with the respective service network node (SGSNa, SGSNn) and a service control function (SCF) is connected via an interface to the service network node (SGSNa, SGSNn) with integrated service switching function (SSF). Given change of the mobile subscriber from one coverage area into another coverage area, a switch is effected from an old association that exists between the service switching function (SSF) integrated in the previous service network node (SGSNa) and the service control function (SCF) to a new association that exists between the service switching function (SSF) integrated in the new service switching node (SGSNn) and the service control function (SCF). The switching is in addition to the switching from the one tunnel (TUa) to the other tunnel (TUb).

15 Claims, 6 Drawing Sheets

METHOD AND MOBILE RADIO TELEPHONE NETWORK FOR HANDLING A PACKET DATA SERVICE

BACKGROUND OF THE INVENTION

The present invention is directed to a method and to a mobile radio telephone network for handling a packet data service.

As known, it is possible to have the connections controlled by an intelligent network (IN) for connection-oriented communication services in a communication network. For example, a CAMEL platform (customized applications for mobile network enhanced logic) is thus defined according to the GSM Recommendation 03.78 for mobile radio telephone networks according to the GSM standard (global system for mobile communication) in order to enable a worldwide use of the performance features of the intelligent network. The standard architecture of the intelligent network provides a service switching function and a service control function that are connected to one another via a signaling link. A specific protocol that is composed of the CAP protocol (CAMEL application part) for the mobile radio telephone network is thereby employed as application.

New data services such as the packet data service GPRS (general packet radio service) according to GSM Recommendation 03.60 are being currently introduced in existing mobile radio telephone networks according to the GSM standard. The transmission in the mobile radio telephone network thereby does not occur connection-oriented but in the form of packet data. This type of transmission utilizes the given transmission resources in the mobile radio telephone network better. The architecture for the packet data service assumes that the communication terminal equipment used by the mobile subscriber—the mobile station—is services at its respective location by a service network node (serving GPRS support node). Access to a packet data network is necessary in order to receive or send packet data. To this end, access network nodes (gateway GPRS support nodes) are offered that respectively realize the access to the packet data network—for example, Internet—and support a specific packet data protocol—for example, Internet protocol. A tunnel via which the packets are transmitted is provided in the mobile radio telephone network between the service network node and the access network node. Since the mobile subscribers with their communication terminal equipment move between a plurality of radio coverage areas of a mobile radio telephone network, the individual subscriber may possibly proceed into the coverage area of a new service network node, so that the tunnel must be switched and the packets are to be transmitted on a new transmission path through the mobile radio telephone network. The previous service network node can no longer control the packet data service for the appertaining subscriber in this case.

SUMMARY OF THE INVENTION

It is an object of the present invention to provide a method and a mobile radio telephone network with which the use of the packet data surface can continue to be enabled for the mobile subscriber given a change of the coverage area.

Proceeding from the handling of a packet data service in the mobile radio telephone network by service network nodes in conjunction with an access network node for the transmission of packet data as well as a tunnel switching given a change of the coverage area, the following ensues. An interworking of the packet data service with network functions of an intelligent network whereof a service switching function is interconnected with the respective service network node and a service control function is connected via an interface to the service network node with integrated service switching function. Given the change of the mobile subscriber from the one coverage area into the other coverage area, a switching from an old association that exists between the service switching function integrated in the previous service network node and the service control function to a new association that exists between the service switching function integrated in the new service network node and the service control function ensues in addition to the switching from the one tunnel to the other tunnel. Only by combining integration of the service switching function into the respective service network node, communication with the service control function, and switching from old association to new association in addition to the switching of the tunnel for the packet data transmission, can packet data service be advantageously handled and controlled like other IN services and also continue to be available to the mobile subscriber (unnoticed and disturbance free) by application of IN functions given a change of the coverage area. The interface between the respective service network node with integrated service switching function and the service control function supports a uniform service handling even given a change of the coverage area, whereby the switching of the association is accompanied by the tunnel switching for the exchange of data, messages and signaling information.

According to a development of the invention, status data that are employed for switching the association between service switching function and service control function are reported from the previous service network node to the service control function before the end of the tunnel switching. The advantage of this modification lies therein that an association that already exists between the service switching function in the previous service network node and the service control function with respect to the subscriber who changes is utilized for reporting the association switching.

According to an alternative development of the invention, status data that are employed for switching the association between service switching function and service control function are requested by the service control function and are reported from the previous service network node. A direct communication between the service switching function the new service network node and the service control function results for information about the new responsibility for the packet data transmission.

According to another alternative development of the invention, status data that are employed for switching the association between service switching function and service control function are reported directly between the old service network node with integrated service switching function and the new service network node with integrated service switching function. In this version, a direct handover of the status data with respect to the association can already advantageously ensue during the interrogation of the new service network node, so that the new service network node is responsible from this moment on for monitoring the packet data stream and, due to the new association, can already supply the current data given log on at the service control function.

According to other beneficial versions of the invention, the new service network node with integrated service switching function reports at the service control function before or after the tunnel switching, continues the monitoring of the packet data transmission on the basis of the new association and makes the status data available to the service control function.

An advantageous development of the invention provides that the service control function receives data with reference whereto it recognizes that a switching of the association is involved and it can assume the monitoring of the packet data transmission.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures of which like reference numerals identify like elements, and in which:

DESCRIPTION OF THE PREFERRED EMBODIMENTS

Figure 1:
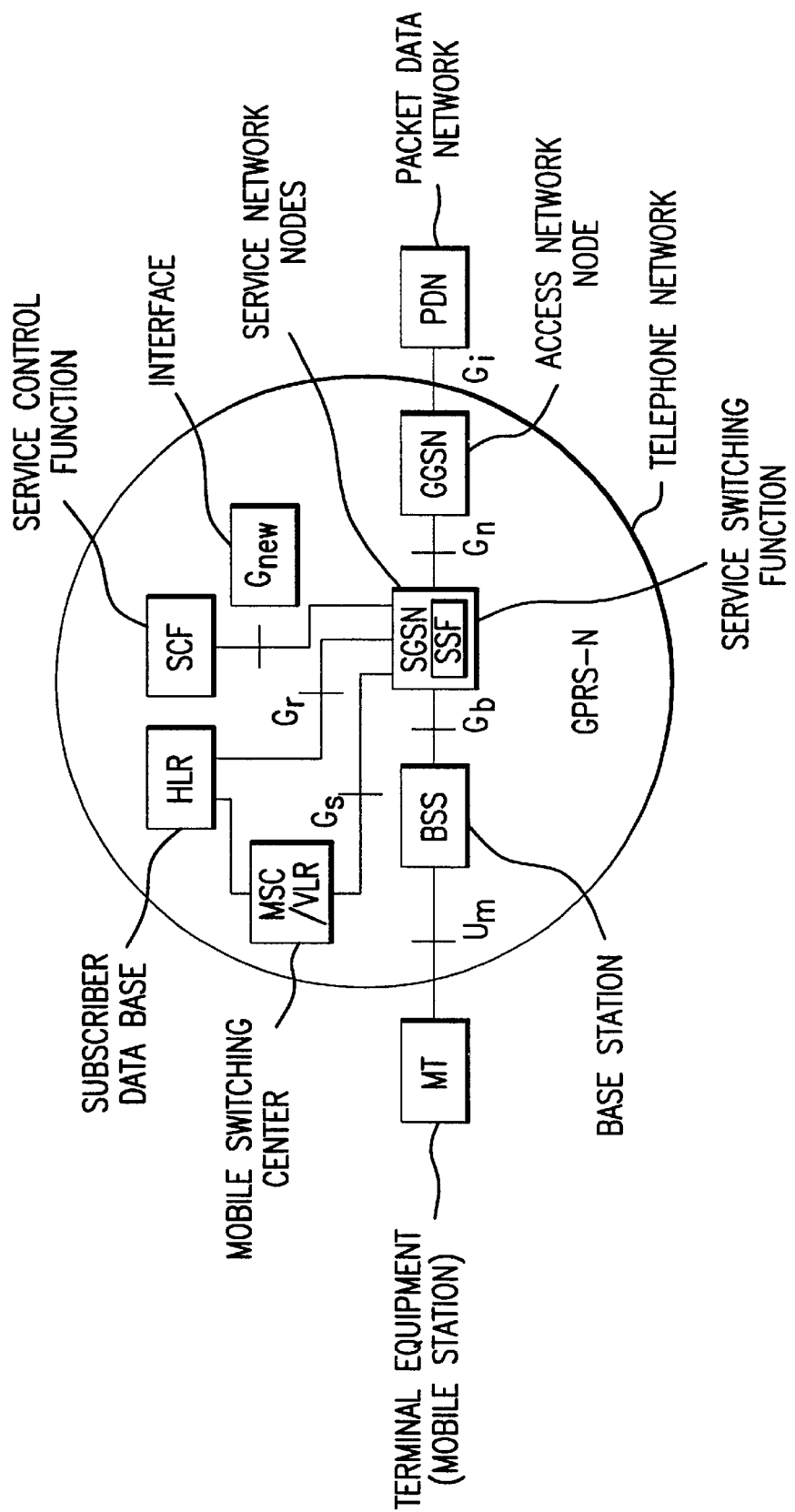
FIG. 1 is a block circuit diagram of a mobile radio telephone network for handling the packet data service.

The block circuit diagram of FIG. 1 shows the network architecture of a mobile radio telephone network GPRS-N for handling the packet data service GPRS. As known, the communication terminal equipment MT (the mobile station) of a mobile subscriber is wirelessly coupled to the mobile radio telephone network GPRS-N via an air interface Um, i.e. to the base station system BSS thereof with stationary base stations and base station controls. For the transmission of packet data between the mobile station MT and a packet data network PDN, the mobile radio telephone network GPRS-N comprises one or more service network nodes SGSN and at least one access network node GGSN. The access network node GGSN is thereby connected via an interface Gi to the packet data network PDN, whereas the service network node SGSN is connected to the base station system BSS via an interface Gb. For realizing switching-oriented functions in the mobile radio telephone network GPRS-N, a mobile switching center MSC with appertaining subscriber data base VLR is coupled to the service network node SGSN via an interface Gs and a subscriber data base HLR is connected to the service network node SGSN via an interface Gr. The registers VLR, HLR, as known, contain the subscriber data of the mobile subscriber, dependent on the location of his mobile station MT.

For handling the packet data service such as an IN service, an interworking of the packet data service ensues with network functions of an intelligent network (IN) whereof a service switching function SSF is interconnected with the service network node SGSN and a service control function SCF is connected via a new interface Gnew to the service network node SGSN with integrated service switching function SSF. Since the service network node SGSN has the necessary subscriber-related data available such as, for example, the current location, the identification data, etc., it is the optimum location for the IN linking. A packet relay that images the interface Gb to the base station system BSS onto the interface Gn to the access network node GGSN and that forwards the data packets in both directions is located in the service network node SGSN. This packet relay is used for the integration of the service switching function SSF in the service network node SGSN. The service switching function SSF is also additionally linked into the signaling at the Gb interface.

The following mechanisms are conceivable for initiating the IN services, including the packet data service:

Personally allocated IN services that are entered in the subscriber data base;

Permanently allocated IN services; and

IN services activated by the subscriber.

Initially, there is no connection in the network for the packet data service. In order to use the service, the mobile subscriber must first log on in the network (as in the case of connection-oriented services as well). On this occasion, the subscriber's identity and authorization are checked. In the second step, a packet data protocol must be activated. The network GPRS-N now establishes a tunnel between the respectively appertaining service network node SGSN and the access network node GGSN to the packet data network PDN. As a result, packets can be exchanged between the subscriber and the packet data network via this tunnel.

Figure 2:
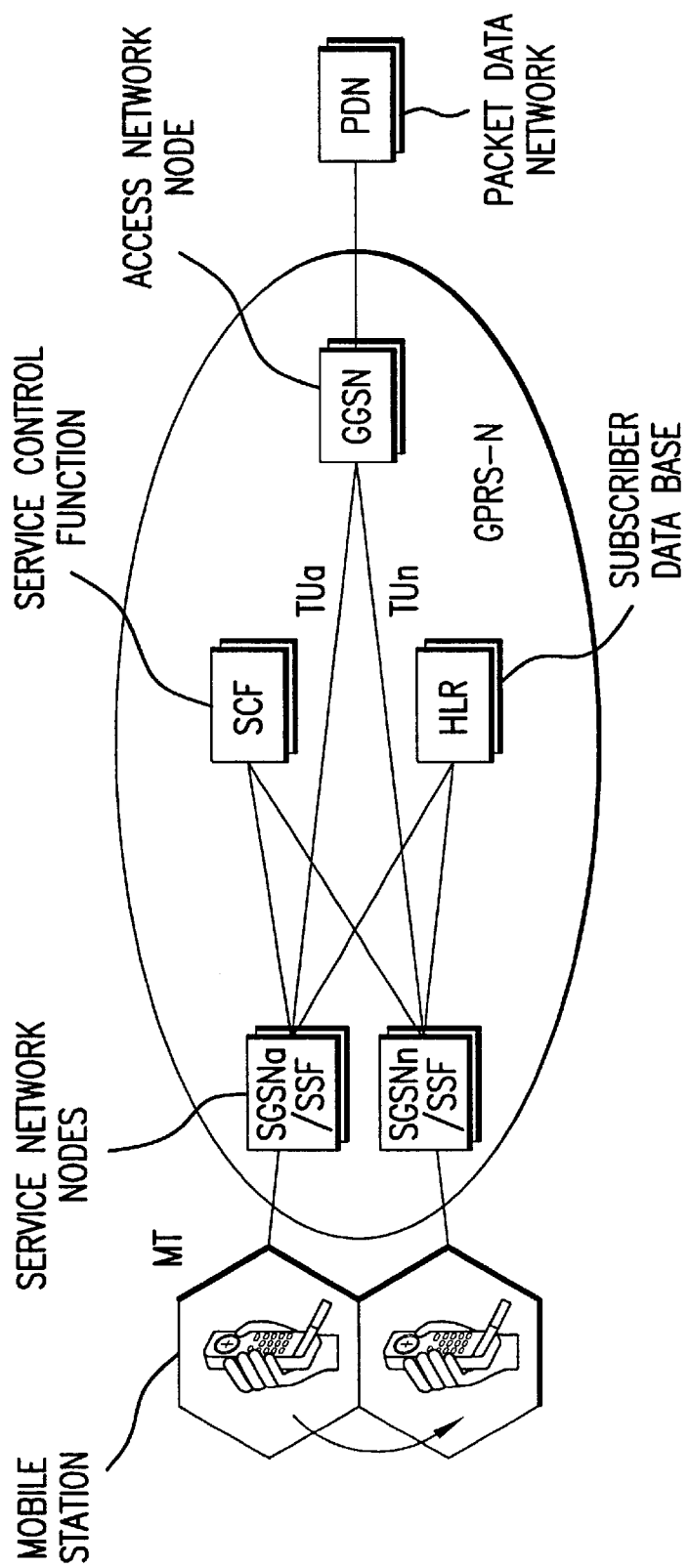
FIG. 2 is a block circuit diagram of the mobile radio telephone network when switching the tunnel for packet data transmission as well as the association given entry of the mobile subscriber into the coverage area of a new service network node.

FIG. 2 shows the equipment of the mobile radio telephone network for handling the packet data service with intelligent network functions in case the mobile subscriber moves with his mobile station MT from the coverage area of a previous service network node SGSNa with integrated service switching function SSF to the coverage area of a new service network node SGSNn with integrated service switching function SSF. Differing from connection-oriented communication, a complete switching from an old tunnel TUa that proceeds between the previous service network node SGSNa with the integrated service switching function SSF and the access network node GGSN to a new tunnel TUn that proceeds between the new service network node SGSNn with the integrated service switching function SSF and the access network node GGSN now ensues in the mobile radio telephone network GPRS-N. The packet data now runs on the new path between the access network node GGSN and the new service network node SGSNn, i.e. the service switching function SSF in the old node SGSNa can no longer carry out its function for the appertaining subscriber. In addition to the tunnel switching, a switching between an old association that exists between the service switching function SSF integrated in the previous service network node SGSNa and the service control function SCF to a new association that exists between the service switching function SSF integrated in the new service network node SGSNn and the service control function SCF therefore occurs.

When changing the coverage area or, respectively, service network node SGSN, which results in the tunnel switching and, in particular, the association switching, a signaling occurs in the network GPRS-N between the new service network node SGSNn an the old service network node SGSNa as well as between the new service network node SGSNn and the access network node GGSN. Further, due to the respective association, messages are exchanged between the old and the new service network node with integrated service switching function SSF and the service control function SCF or, respectively, the subscriber data base. The entire message traffic serves the purpose of switching the tunnel and the association and of maintaining the control and monitoring of the packet data transmission even given a change of the coverage area. Further, subscriber data are reported to the service network node SGSNn and the new location of the subscriber in the network is registered. There are a number of versions of the message flow according to FIG. 3 through FIG. 6 that sequences between the devices shown in FIG. 2 for this purpose.

Figure 3:
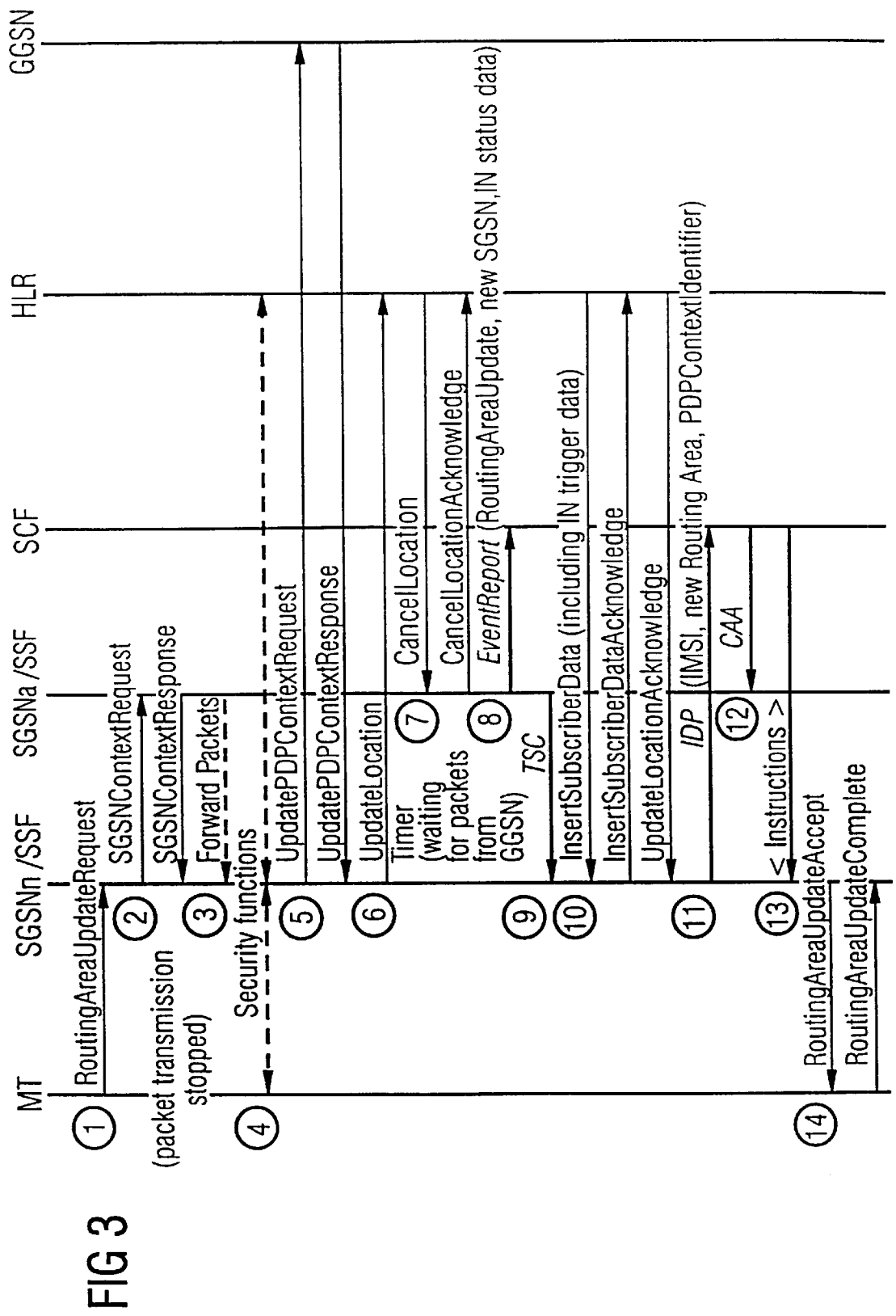
FIG. 3 is a first version of the message flow between the network equipment of the mobile radio telephone network given change of the service network node.

FIG. 3 assumes that an association already exists between the old service network node SGSNa/SSF with integrated service switching function and the service control function SCF with respect to the subscriber who changes the coverage area or, respectively, the service network node. With respect to this association, the service control function SCF already previously sent instructions in order, for example, to implement a counting of the transmitted packets according to the packet data service. The following steps characterize the message flow:

(1): The mobile station MT sends a message RoutingAreaUpdateRequest that proceeds to the new service network node SGSNn and with which an updating of the data in the network is requested on the basis of a change of the coverage area. The transmission of packets from the mobile station MT is temporarily suspended.

(2): The new service network node SGSNn sends the message SGSNContextRequest to the old service network node SGSNa in order to request the context data for the mobile station MT. The old service network node SGSNn sends the context data back in the message SGSNContextResponse.

(3): The old SGSN starts a timer and conducts packets that are still arriving via the previous tunnel (see FIG. 2) from the access network node GGSN to the new service network node SGSNn, where they are stored. The old service network node SGSNa must continue to count incoming packets and potentially monitor thresholds if this is necessary (see above under (1)). After the expiration of the timer, the context data for the subscriber are finally deleted and packets are no longer forwarded.

(4): The known security functions (including authentification) are implemented—according to the GGSN standard in the present example.

(5): With a message UpdatePDPContextRequest, the new service network node SGSNn now requests the access network node GGSN to switch from the old tunnel to the new tunnel (see FIG. 2). This acknowledges the request message with a message UpdatePDTPContextResponse.

(6): The new service network node SGSNn informs the home register HLR of the new location of the subscriber in a message UpdateLocation.

(7): With the message CancelLocation, the home register HLR requests that the old service network node SGSNa remove the subscriber from its data base. The deletion is confirmed with the message CancelLocationAcknowledge. The subscriber data, however, are only deleted after expiration of the timer if this is active. After expiration of the timer (or, respectively, if this is not active: after receipt of the message CancelLocation), the old service network node SGSNa can assume that the tunnel has been switched and new packets will no longer arrive from the access network node GGSN.

(8): The previous service network node SGSNa with integrated service switching function SSF now reports the change of subscriber to the service control function SCF in a message EvenReport. With this message, the service control function SCF is also informed that a switching to a new association is pending because of the change of coverage area, recognizable, for example, on the basis of data RoutingAreaUpdate, new SGSN that the message EventReport contains. Above all, status data INstatusdata are also sent in this EventReport message, these being employed for switching the association between the service switching function SSF and service control function SCF. A seamless transition to the new service network node SGSNn is thus implemented with an offering of the status data by the old service network node SGSNa before the end of the tunnel switching. Such status data can, for example, cover counter readings about transmitted and/or received packets, the address of the new service network node, charge data, etc. In the intelligent network, specific events lead to status changes and, thus, to a successive message exchange between the intelligent network function SSF and SCF. The triggering event ("event detection point") is the network-side reception of the message RoutingAreaUpdateRequest from the mobile station MT in the present example.

Based on the message EventReport, the service control function SCF recognizes that the subscriber has switched into the coverage area of the new service network node SGSNn, and switches into a status in which it waits for the new service network SGSNn to log on at it. Further actions can already be undertaken in the meantime, thus, for example, a charging of incurred fees on the basis of the reported counter readings.

(9): The old service network node SGSNa now sends a message TSC (TunnelSwitchingComplete) to the new service network node SGSNn in which it communicates that a switch has now been successfully made from the previous tunnel to the new tunnel and no further packets are present. This message advantageously serves for synchronization in order to prevent the new service network node SGSNn from logging on at the service control function SCF without having already obtained the log off from the old service network node SGSNa.

(10): The new service network node SGSNn receives the subscriber data from the home register HLR via the message InsertSubscriberData. The service network node SGSNn confirms this message with InsertSubscriberDataAcknowledge. The UpdateLocation procedure is terminated by the home register HLR UpdateLocation. Trigger data INtriggerdata are also located in the subscriber data, these signaling that the subscriber has subscribed to an IN service. It is likewise possible that it is permanently set within the new service network node SGSNn that the intelligent network must now be engaged.

(11): The new service network node SGSNn sends an initialization message IDP (InitialDetectionPoint) to the service control function SCF in which it communicates that the subscriber is now in its coverage area. This message IDP contains a plurality of data IMSI, newRoutingArea, PDNContextIdentifier, whereof the datum IMSI represents a subscriber identifier of the mobile subscriber, the datum newRoutingArea represents a coverage area identifier and the datum PDContextIdentifier represents an identifier of the respective packet data transmission. The datum PDContextIdentifier allows the service control function SCF to make an unambiguous identification of a packet "session" in the mobile radio telephone network. This is necessary when, for example, a plurality of packet data transmissions and, thus, a plurality of SCF/SSF associations exist for a subscriber. The datum PDContextIdentifier is already transmitted in the message SGSNContextResponse to the new service network node SGSNn. The new service network node SGSNn/SSF with integrated service switching function now switches into a status in which it waits for instructions of the service control function SCF.

(12): On the basis of the message IDP of the new service network node SGSNn/SSF, the service control function SCF recognizes that it is a matter of the subscriber that was logged from the old service network node SGSNa. The service control function SCF now ends the association with the previous service network node SGSNa/SSF with integrated service switching function in final form. To that end, the message CAA (cancel association) is preferably sent to the service switching function SSF in the old service network node SGSNa, so that the latter receives the confirmation that the switch of the SSF/SCF association onto the new service network node SGSNn/SSF with integrated service switching function has ensued.

(13): The service control function SCF now sends new instructions in that, for example, new thresholds are defined for transmitted packets.

(14): The RoutingAreaUpdate procedure is terminated by the messages RoutingAreaUpdateAccept and RoutingAreaUpdateComplete. The packet transmission from/to the communication terminal equipment MT can be continued.

Figure 4:
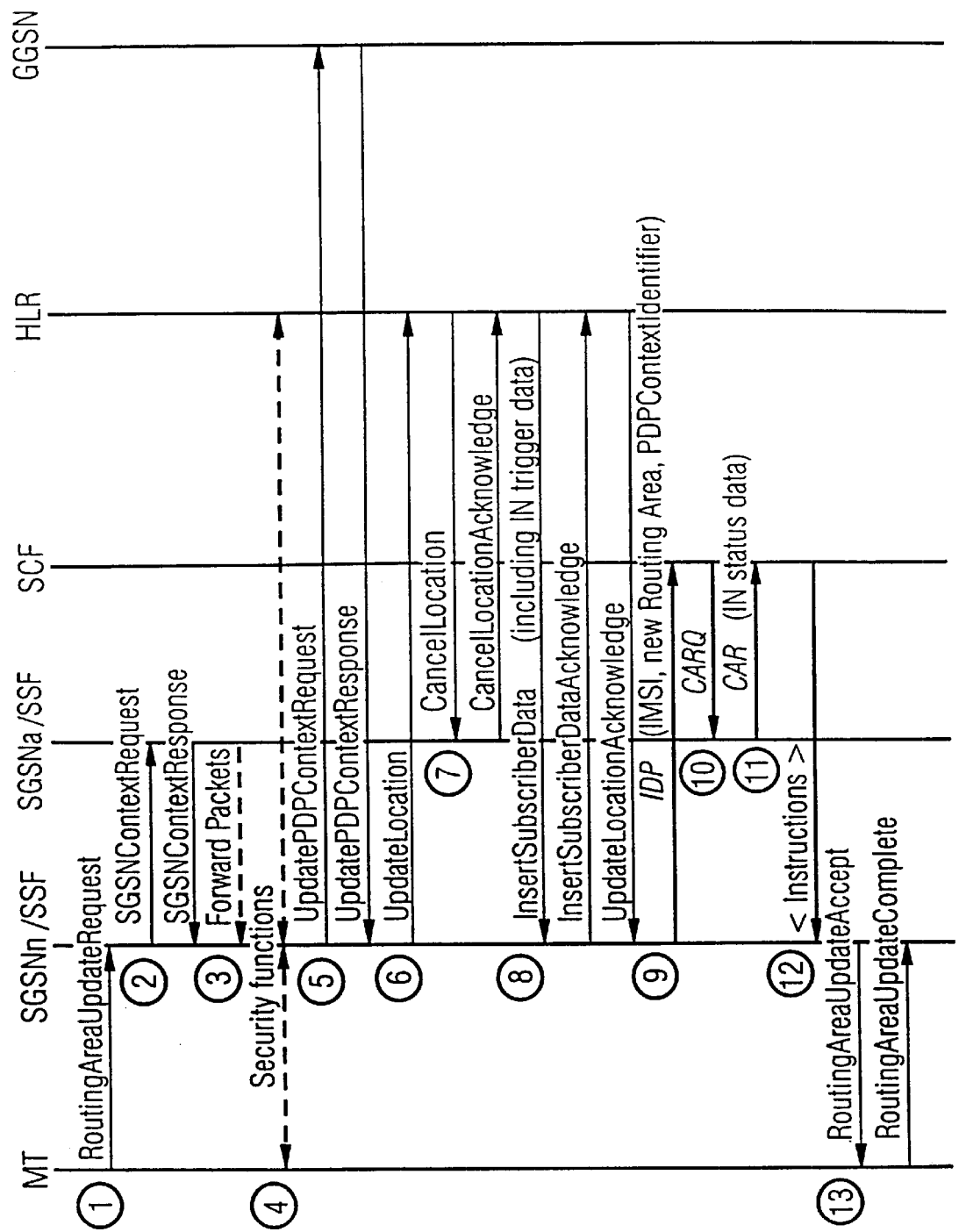
FIG. 4 is a second version of the message flow between the network equipment given change of the service network node.

FIG. 4 shows another version of the message flow, whereby the change of the subscriber from the old service network node SGSNa as well as the status data are not actively reported to the service control function SCF; rather, the new service network node SGSNn logs on directly at the service control function SCF after the switching from the previous to the new tunnel. The service control function SCF subsequently ends the old association with the service switching function SSF integrated in the old service network node SGSNa and thereby requests terminating status data from it. The steps (1) through (6) of the message flow are identical to those of FIG. 3.

(7): The home register HLR requests the old service network node SGSNa to remove the subscriber from the data base (CancelLocation). This is confirmed with CancelLocationAcknowledge. The subscriber data, however, are not deleted until after the expiration of the timer, if this is active. After expiration of the timer (or, respectively, if this is not active: after receipt of the CancelLocation), the old service network node SGSNa can assume that the tunnel has been switched and new packets will no longer arrive from the access network node GGSN.

(8): The new service network node SGSNn receives the subscriber data from the home register HLR according to the message InsertSubscriberDataAcknowledge. The service network node SGSNn acknowledges this with the message InsertSubscriberDataAcknowledge. The UpdateLocation procedure is terminated by the home register HLR with the message UpdateLocationAcknowledge. The data Intriggerdata that indicate that the subscriber has subscribed to an IN service are also located in the subscriber data. It is likewise possible that it is permanently set within the service network node SGSNn that the intelligent network must now be engaged.

(9): The new service network node SGSN sends the initialization message IDP to the service control function SCF, informing it therein that the subscriber is now in its coverage area and, thus, is its responsibility. This message IDP contains the data IMSI, newRoutingArea, PDContextIdentifier that were already described with reference to FIG. 3. On the basis of the data in the message IDP, the new service network node SGSNn indicates the switching to a new SSF/SCF association. The new service network node SGSNn/SSF with integrated service switching function then switches into a status in which it waits for instructions from the service control function SCF.

(10): On the basis of the message IDP of the new service network node SGSNn/SSF, the service control function SCF recognizes that it is a matter of the subscriber that was logged off from the old service network node SGSNa. The service control function SCF now ends the previous association to the service switching function SSF integrated in the old service network node SGSNa by sending the message CARQ (CancelAssociationRequest) to the service network node SGSNa.

(11): The old service network node SGSNa answers with the message CAR (Cancel Association Response), whereby all status data of the previous association are co-transmitted (see (1)).

(12): Subsequently, the service control function SCF sends new instructions in that, for example, new thresholds for transmitted packets are defined.

(13): The RoutingAreaUpdate procedure is terminated by the messages RoutingAreaUpdateAccept and RoutingAreaUpdateComplete. The packet transmission from/to the communication terminal equipment MT can be continued.

Figure 5:
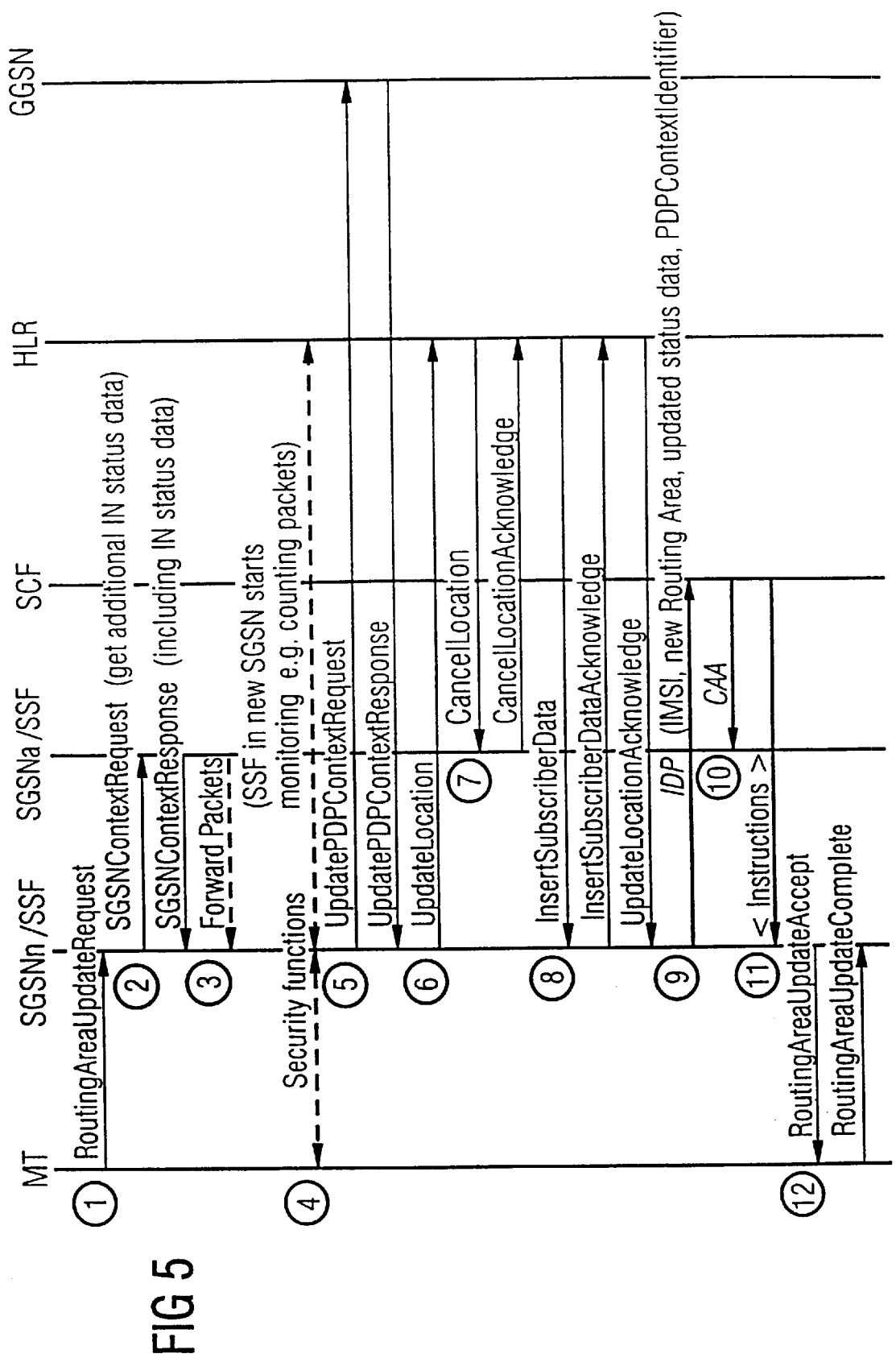
FIG. 5 is a further version of the message flow between the network equipment of the mobile radio telephone network given change of the service network node.

In a further version according to FIG. 5, a direct handover of the status data with respect to the switching of the SSF/SCF association ensues between the old service network node SGSNa and the new service node SGSNn. The status data INstatusdata are already transmitted by the new service network node SGSNn during the context interrogation. Before the switch from the previous tunnel to the new tunnel, the new service network node SGSNn logs on at the service switching function SSF and continues the monitoring of the packet data transmission or, respectively, of the packet data stream on the basis of the new association. Upon log-on at the service control function SCF, the service switching function SSF in the new service network node SGSNn can thus already co-transmit the current status data early.

(1): The mobile station MT sends a RoutingAreaUpdateRequest message to the new service network node SGSNn. The transmission of packets from the mobile station MT is temporarily suspended. The new service network node SGSNn requests the context data from the old service network node SGSNa after receiving the RoutingAreaUpdate request.

(2): Status data INstatusdata that directly signal the new service network node SGSNn that a new SSF/SCF association exists for the subscriber are now incorporated into the response message SGSContextResponse of the old service network node SGSNa to the new service network node SGSNn. The status data INstatusdata (for example, counter readings for packets, etc.) are also contained in this message. From this point on, the packet data stream arriving from the access network node GGSN is no longer monitored by the service switching function SSF of the previous service network node SGSNa but by the new service network node SGSNn with integrated service switching function SSF. For the moment, however, a reporting of events to the service control function SCF is not yet possible.

(3): The old service network node SGSNa starts a timer and conducts packets that still arrive from the access network node GGSN via the tunnel to the new service network node SGSNn, where they are stored. The packets are counted in the new service network node SGSNn. After expiration of the timer, the subscriber context data are finally deleted and packets are no longer forwarded. The steps (4)

(authentication) through (12) (ending the Routing Update procedure) correspond to the steps in the procedure of FIG. 4. It is thereby advantageous that (according to Step (9)) the new association was already incorporated into the initialization message IDP and, thus, altered status data can be reported from the new service network node SGSNn to the service control function SCF.

Figure 6:
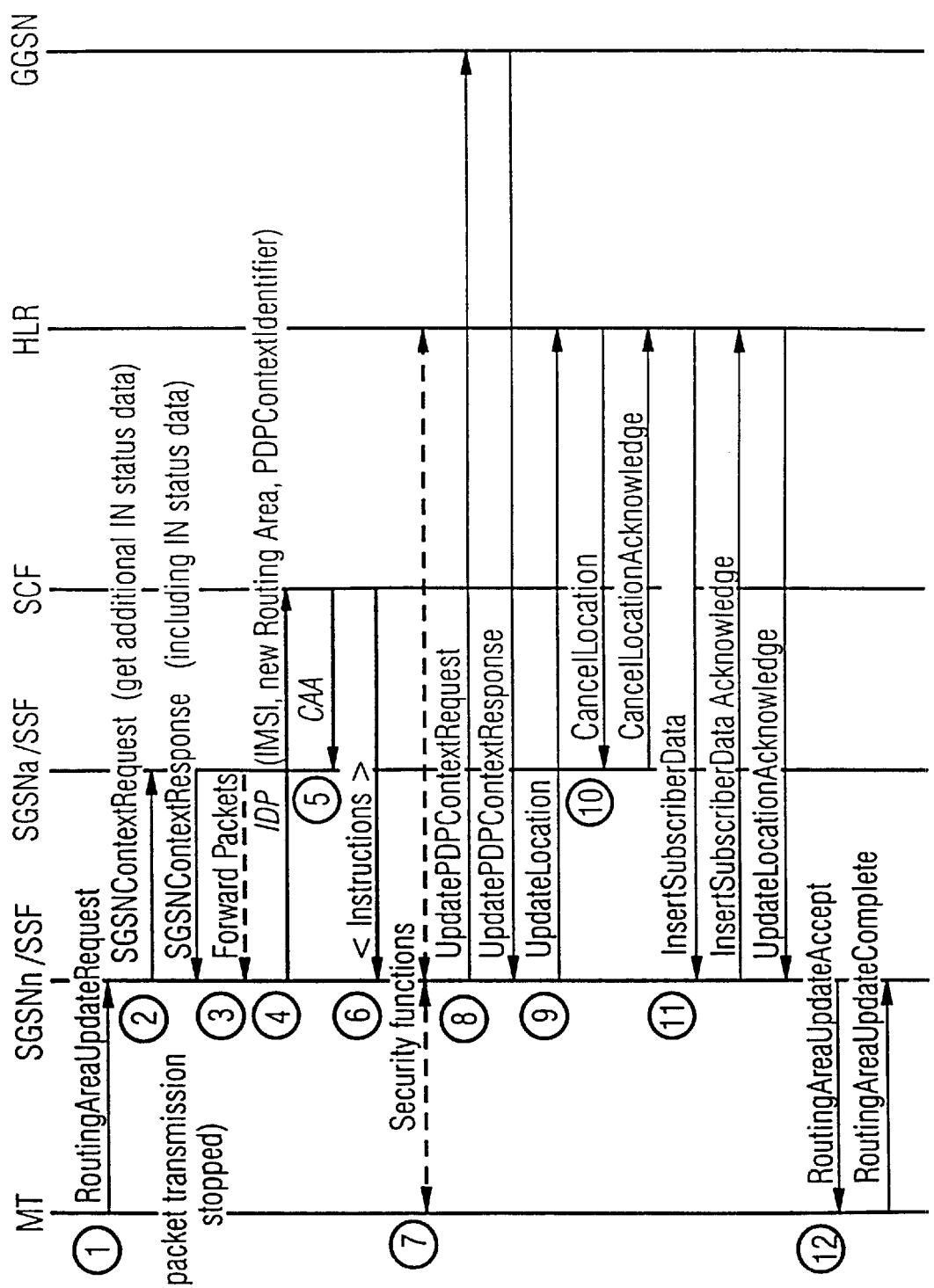
FIG. 6 is a further version of the message flow between the network equipment of the mobile radio telephone network given change of the service network node.

In a further version according to FIG. 6, a direct handover of the status data with respect to the switching of the SSF/SCF association likewise ensues between the old service network node SGSNa and the new service network node SGSNn. The status data INstatusdata are already transmitted during the context interrogation by the new service network node SGSNn. Differing from FIG. 5, the log-on of the new service network node SGSNn at the service control function SCF only ensues after the switching from the previous tunnel to the new tunnel. The old service network node SGSNa retains the control of the packet data transmission before and during the switching. The Steps (1) through (3) are to be implemented according to the message flow according to FIG. 5. The necessary data for triggering the IN service (for example, CAMEL service indication) are thereby co-supplied from the old service network node SGSNa in the message SGSNContextResponse. Beginning immediately after the context interrogation, the service switching function SSF in the new service network node SGSNn already begins monitoring the packet data stream in order to be able to communicate status data to the service control function SCF later on demand.

The initialization message IDP with the data IMSI, newRoutingArea, PDContextIdentifier (described above) are already sent from the new service network node SGSNn to the service control function SCF in Step (4), it being communicated therein, among other things, that the subscriber is now in its coverage area and, thus, is under its responsibility.

In Step (5), the service control function SCF ends the previous association with the old service network node SGSNa/SSF with integrated service switching function by sending the message CAA (cancel association). According to Step (6), the new service network node SGSNn/SSF with integrated service switching function switches into a status in which it waits for instructions from the service control function SCF.

The remaining Steps (7) through (11) in FIG. 6 are identical to the Steps (4) through (8) according to FIG. 5. The Step (12) in FIG. 6 is the same as the Step (12) in FIG. 5, so that these Steps are implemented analogous to the above explanations and procedures.

The invention is not limited to the particular details of the method and apparatus depicted and other modifications and applications are contemplated. Certain other changes may be made in the above described method and apparatus without departing from the true spirit and scope of the invention herein involved. It is intended, therefore, that the subject matter in the above depiction shall be interpreted as illustrative and not in a limiting sense.

What is claimed is:

1. A method for handling a packet data service in a mobile radio telephone network, packet data being transmitted between a communication terminal equipment of a mobile subscriber and service network nodes of a mobile radio telephone network and an access network node of the mobile radio telephone network for the linking to a packet data network, and, given a change of A mobile subscriber from a coverage area of a previous service network node into a coverage area of a new service network node, a switch being made from a previous tunnel that proceeds between the previous service network node and the access network node to a new tunnel that proceeds between the new service network node and the access network node, comprising the steps of:

an interworking of the packet data service ensues with network functions of an intelligent network whereof a service switching function is interconnected with a respective service network node and a service control function is connected via an interface to the respective service network node with integrated service switching function; and upon change of the mobile subscriber from one coverage area into another coverage area, a switch is carried out from an old association that exists between the service switching function integrated in the previous service network node and the service control function to a new association that exists between the service switching function integrated in the new service network node and the service control function, said switch being carried out in addition to the switching from the one tunnel to the other tunnel.

2. The method according to claim 1, wherein status data that is employed for switching the association between service switching function and service control function is reported from the previous service network node to the service control function before an end of the tunnel switching.

3. The method according to claim 2, wherein the status data is reported based on a message that is initiated by the service switching function integrated in the previous service network node.

4. The method according to claim 2, wherein the previous service network node sends a message to the new service node in which the previous service network node communicates that a successful switch has been made from the previous tunnel to the new tunnel and no further packets are present.

5. The method according to claim 1, wherein status data, that is employed for the switching of the association between service switching function and service control function is requested by the service control function and reported from the previous service network node.

6. The method according to claim 1, wherein status data, that is employed for switching the association between service switching function and service control function, is directly reported between the old service network node with integrated service switching function and the new service network node with integrated service switching function.

7. The method according to claim 6, wherein the new service network node with integrated service switching function logs on at the service control function before the tunnel switching and continues monitoring of the packet data transmission based on the new association and also makes the status data available to the service control function.

8. The method according to claim 6, wherein the new service network node with integrated service switching function logs on at the service control function after the tunnel switching and continues monitoring of the packet data transmission based on the new association and also makes status data available to the service control function.

9. The method according to claim 8, wherein the old service network node with integrated service switching function retains the monitoring of the packet data transmission before and during the tunnel switching.

10. The method according to claim 1, wherein data, is received by the service control function, based on the service control function recognizing that a switching of the association is involved and the service control function can continue monitoring of the packet data transmission.

11. The method according to claim 10, wherein the data contains at least one of the following: at least one subscriber identifier, an identifier of a respective packet data transmission, and a coverage area identifier.

12. The method according to claim 1, wherein the new service network node with integrated service switching function sends an initialization message to the service control function which, in response thereto, sends a message for ending the previous association to the old service network node.

13. The method according to claim 12, wherein the new service network node with integrated service switching function switches into a status in which the new service network node waits for instructions of the service control function with respect to further transmission of packet data.

14. The method according to claim 1, wherein trigger data that signals the interworking with the network functions of the intelligent network are made available to the new service network node with integrated service switching function.

15. A mobile radio telephone network for handling a packet data service with an access network node for linking to a packet data network and with service network nodes for transmission of packet data from or to a communication terminal equipment of a mobile subscriber, the packet data transmission given a change of the mobile subscriber from a coverage area of a previous service network node into a coverage area of a new service network node is switchable from a previous tunnel that proceeds between the previous service network node and the access network node to a new tunnel that proceeds between the new service network node and the access network node, comprising:

for interworking of the packet data service with network functions of an intelligent network, a respective service network node being arranged such that the respective service network node is interconnected with a service switching function and such that a service control function is connected via an interface to the respective service network node with integrated service switching function; and given a change of the mobile subscriber from the one coverage area into another coverage area, a switch being effectable from an old association that exists between the service switching function integrated in the previous service network node and the service control function to a new association that exists between the service switching function integrated in the new service network node and the service control function, being switchable in addition to the switching from the one tunnel to the other tunnel.

* * * * *